United States Patent Office 3,061,497
Patented Oct. 30, 1962

3,061,497
REINFORCED POLYURETHANE PLASTICS
Joseph E. Wilson, Newark, and Stanley Cear, Wilmington, Del., assignors to Atlas Chemical Industries, Inc., a corporation of Delaware
No Drawing. Filed Nov. 13, 1959, Ser. No. 852,594
3 Claims. (Cl. 156—30)

This invention relates to reinforced plastic compositions and particularly to such compositions based on condensation products of polyfunctional polyethers and diisocyanates.

Reinforced plastics comprising polyester resins or copolymers of polyester resins with vinyl monomers reinforced with filaments or fibers of diverse material such as glass, nylon, cellulose, asbestos and the like are well known. The said reinforcing materials may be in the form of fibers randomly distributed throughout the entire plastic mass. Alternatively, they may take the form of mats of felted fibers, or substantially parallel filaments, or of woven fabrics employing yarns spun from fibers or comprising bundles of filaments arranged in layers within the plastic. Such reinforced laminates have good flexural and impact strength properties but leave something to be desired in the way of resistance to attack by chemicals In accordance with the present invention reinforced laminates or castings employing conventional reinforcing materials are provided in which the resinous component is the highly cross-linked condensation product of an arylene diisocyanate and a polyoxypropylene sorbitol ether containing from about 8 to about 30 oxypropylene groups per mol. Suitable arylene diisocyanates include phenylene diisocyanate, tolylene diisocyanates, naphthylene diisocyanates, 4,4'-diphenyl isocyanate and the like. Preferred for reasons of availability are the tolylene diisocyanates, particularly mixtures of 2,4- and 2,6-tolylene diisocyanate.

The diisocyanate and polyoxypropylene sorbitol ether are employed in the laminating or casting resins of the invention in substantially stoichiometric proportions, calculated on isocyanate function of the former and the hydroxyl function of the latter. Exact stoichiometry is not required but to minimize the occurrence of reactive chemical groups in the finished product, it is advisable to keep the excess of either reactant below 10%.

The reaction between hydroxyl compounds and isocyanates is exothermic and when stoichiometric proportions of an arylene diisocyanate and a polyoxypropylene sorbitol ether are mixed, it is difficult to control the rate of reaction. This difficulty may be avoided by first condensing the diisocyanate with a minor proportion of the sorbitol ether to form a syrupy condensation product with an excess of isocyanate groups, cooling this condensation product, and mixing it with sufficient polyoxypropylene sorbitol ether to supply the stoichiometric balance at the time the laminate or casting is constructed.

Reinforced plastic compositions in accordance with the invention may, in general, contain from about 35% to about 65% fibrous reinforcing material and, correspondingly, from about 65% to about 35% resin. Preferred compositions contain from 40% to 50% fiber.

The curing may be effected over a wide range of conditions. In the presence of known catalysts for the reaction between isocyanates and compounds containing active hydrogen, such as tertiary amines or organic tin compounds, the cure may be effected at room temperature. In the interest of speeding the cure, higher temperatures, even up to 250° C. may be employed. A generally preferred temperature range is from 110° to 130° C.

Times of cure, depending on the temperature and on the type and concentration of catalyst, if any, may vary from as little as a few minutes to several hours. In the preferred temperature range and in the absence of catalyst from 30 minutes to an hour will usually suffice.

The pressure employed during the cure likewise may vary widely. Perfectly satisfactory laminates may be obtained under molding pressures as low as 50 pounds per square inch. This permits the use of light weight and inexpensively constructed molds which is of especial advantage in the formation of large pieces. Any higher pressures such, for example, as 10,000 pounds per square inch or even higher may be employed if desired.

The invention will be more readily comprehended by consideration of the following examples which are presented for illustrative purposes only and are not to be construed as limiting the invention.

Example I

A condensation product containing a stoichiometric excess of isocyanate was prepared by reacting 12.920 kilograms of tolylene diisocyanate and 3.713 kilograms of a polyoxypropylene ether of sorbitol containing approximately 10 oxypropylene groups per mol for 30 minutes at 70° C. In these reactants the ratio NCO/OH is approximately 4.5. The condensation product, on cooling to room temperature, was a storage-stable viscous syrup.

175 grams of the isocyanate-rich syrupy condensation product was then thoroughly mixed with 138 grams (the stoichiometric quantity) of the same polyoxypropylene sorbitol ether and the mixture employed to saturate a 3 ply structure of 1½ oz. chopped strand fiber glass mat. The entire mass was cured in a preheated press at 250° F. (121° C.) for 45 minutes at 10,000 pounds per square inch pressure. The resulting product, containing glass fiber and cured resin in approximately equal proportions, was a tough, rigid glass reinforced polyurethane laminate which yielded the following values on physical testing:

Flexural strength=23,525±2029 p.s.i.
Modulus of elasticity=$0.875 \times 10^6$ p.s.i.

Example II 11.745 kilograms of tolylene diisocyanate and 4.305 kilograms of a polyoxypropylene sorbitol ether containing approximately 13.5 oxypropylene groups per mol were mixed and held at 70° C. for a half hour to form a viscous syrupy condensation product containing a considerable proportion of unreacted isocyanate groups. The ratio of NCO/OH in the reactants was 4.5.

152 grams of the cooled syrupy condensate and 142 grams of the same polyoxypropylene ether were thoroughly mixed and employed in the manner described in Example I. The resulting product was a tough, rigid, glass fiber-reinforced, polyurethane plastic which yielded the following results on physical testing:

Flexural strength=21,779±2715 p.s.i.
Modulus of elasticity=$0.923 \times 10^6$ p.s.i Samples ¼ inch by 2 inches were cut from the laminate of Example II and tested for chemical resistance by immersion in different solvents for one week. The results were as follows.

| Solvent | Condition of sample after 1 week |
|---|---|
| Benzene | Good. |
| 5% sodium hydroxide | Excellent. |
| 5% sulfuric acid | Do. |
| Mineral spirits | Do. |
| Distilled water | Do. |
| Methanol | Good. |
| Ethanol | Do. |
| Toluene | Excellent. |

By employing polyoxypropylene sorbitol ethers of varying oxypropylene content the properties, particularly the elasticity, of the cured resin laminates can be varied. In general, increasing the oxypropylene content of the ether increases the elasticity of the laminate made therefrom.

What is claimed is:

1. A reinforced plastic composition comprising a fibrous reinforcing material imbedded in and bonded by the cured reaction product of substantially stoichiometric proportions of an arylene diisocyanate and a polyoxypropylene sorbitol ether containing from about 8 to about 30 oxypropylene groups per mol.

2. A process for producing a reinforced plastic composition which comprises impregnating a fibrous reinforcing material with a mixture, in substantially stoichiometric proportion, of an arylene diisocyanate and a polyoxypropylene sorbitol containing from about 8 to about 30 oxypropylene groups per mol and curing the assembly at elevated temperature and pressure.

3. A process for preparing a plastic laminate which comprises preparing a syrupy condensation product of a stoichiometric excess of an arylene diisocyanate and a polyoxypropylene sorbitol ether containing from about 8 to about 30 oxypropylene groups per mol, impregnating, at room temperature, a plurality of layers of a fibrous reinforcing material with a mixture of said condensation product and sufficient of the said polyoxypropylene ether to bring the NCO/OH ratio to substantially one, and curing the assembly at elevated temperature and pressure.

References Cited in the file of this patent

UNITED STATES PATENTS

| | | |
|---|---|---|
| 2,492,498 | Pedersen | Dec. 27, 1949 |
| 2,866,774 | Price | Dec. 30, 1958 |
| 2,927,918 | Anderson | Mar. 8, 1960 |